(12) United States Patent
Renner

(10) Patent No.: US 7,334,493 B2
(45) Date of Patent: Feb. 26, 2008

(54) DEVICE FOR REDUCTION OF AXIAL MOVEMENT OF THE MAIN SHAFT GEARS IN A TRANSMISSION WITH AT LEAST TWO COUNTERSHAFTS

(75) Inventor: Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 110 days.

(21) Appl. No.: 11/286,642

(22) Filed: Nov. 23, 2005

(65) Prior Publication Data

US 2006/0112778 A1    Jun. 1, 2006

(30) Foreign Application Priority Data

Nov. 26, 2004  (DE) .................... 10 2004 057 126

(51) Int. Cl.
*F16H 3/38* (2006.01)
(52) U.S. Cl. ............................ 74/339; 74/325; 74/329; 74/330; 74/331; 384/619; 384/620
(58) Field of Classification Search ............. 74/325, 74/329, 339, 330, 331; 384/619, 620
See application file for complete search history.

(56) References Cited

U.S. PATENT DOCUMENTS

| 4,873,882 | A | | 10/1989 | Goscenski, Jr. | |
|---|---|---|---|---|---|
| 5,035,309 | A | * | 7/1991 | Takada | 192/45 |
| 5,855,518 | A | * | 1/1999 | Tanaka et al. | 464/38 |
| 5,937,982 | A | * | 8/1999 | Olson et al. | 192/53.31 |
| 6,250,170 | B1 | * | 6/2001 | Hill et al. | 74/89.23 |
| 6,463,822 | B1 | * | 10/2002 | Bader et al. | 74/333 |
| 2004/0075353 | A1 | * | 4/2004 | Walther et al. | 310/90 |
| 2004/0134708 | A1 | * | 7/2004 | Tanaka et al. | 180/417 |

FOREIGN PATENT DOCUMENTS

| DE | 37 08 100 A1 | 9/1988 |
|---|---|---|
| DE | 37 36 597 A1 | 5/1989 |
| EP | 0 361 686 A1 | 4/1990 |
| EP | 0 572 126 A1 | 12/1993 |

* cited by examiner

*Primary Examiner*—David D. Le
(74) *Attorney, Agent, or Firm*—Davis Bujold & Daniels, P.L.L.C.

(57) ABSTRACT

A device for the reduction of axial movement of the main shaft gears (2) in a transmission containing at least two countershafts. The main shaft gears (2) are held axially by two washer discs (3, 4) which is designed to be a pressing device (5, 6) on the main shaft (1) for at least one of the main shaft gears (2) against the washer disc (3) holding the main shaft gear (2) axially.

6 Claims, 1 Drawing Sheet

DEVICE FOR REDUCTION OF AXIAL MOVEMENT OF THE MAIN SHAFT GEARS IN A TRANSMISSION WITH AT LEAST TWO COUNTERSHAFTS

This application claims priority from German Application Serial No. 10 2004 057 126.0 filed Nov. 26, 2004.

FIELD OF THE INVENTION

The following invention relates to a device for reduction of the axial movement of the main shaft gears in a transmission with at least two countershafts.

BACKGROUND OF THE INVENTION

In the state of the art for transmissions with at least two countershafts, the free gears which serve as main shaft gears are placed radially in both the gears of the countershafts. The main shaft gears are placed on the main shaft in the axial direction with the help of washer discs whereby a washer disc of the free gear is arranged between the washer discs arranged on the main shaft. There is a disadvantage here whereby due to production tolerances and due to the gaps required for oiling, a large play arises so that when the mass of the free gears vibrate as a result of the wobbling of the main shaft or as a result of rotational movements and thus cause an unpleasant rattling noise.

With reference to EP 0 361 685 A1, for a transmission with one countershaft it was suggested that the gear of the drive arranged on the countershaft be placed on the countershaft in such a way that the vibration of the gear is not transferred to the countershaft by a small play and through an attenuating element joined to the gear and parallel to the countershaft. The rattling noise could also be reduced as a result of this. This construction proved to be expensive and the rattling noise could not be completely suppressed since the other gears arranged on the countershaft are in contact with the corresponding free gears of the drive shaft without any further constructive measures.

In addition, it is also known that in the case of axial placement of the main shaft gears another additional disc is placed near the washer disc of the main shaft which is between the two washer discs of the main shaft. This disc is fixed firmly to the main shaft gear and is supported by the front end of the gear teeth of the countershaft or the intermediate shaft used for the reverse gear. The main shaft gear is also pressed or pushed against the disc through spring action. In the case of such a construction, the assembly could prove to be disadvantageous.

The following invention has the objective of designing a device for reduction of the axial movement of the main shaft gears in a transmission with at least two countershafts which overcomes this disadvantage of the state of the art. The innovative construction should be especially cost effective to produce and easy to assemble.

SUMMARY OF THE INVENTION

According to the invention, it is suggested that the axial movement of the main shaft gears be reduced by cushioning the gears. Hereby the play between the main shaft gears and the washer discs holding the gears axially are minimized.

As a result, the gears cannot move axially any more.

An innovative device for reduction of the axial movement of the main gears is suggested whereby the main shaft gears are held with the help of two washer discs which is constructed as a pressing device on the main shaft for at least one of the main shaft gears against a washer disc holding the main shaft gear axial.

A device for reduction of the axial movement of the main shaft gears has been suggested which comprises of one spring element and a ring disc for at least one main shaft gear which are assembled in such a way that the spring element presses the ring disc against the main shaft gear so that the axial movement of the main shaft gear is prevented.

With reference to the preferred design of the invention, the ring disc is arranged concentrically to the washer disc holding the main shaft gear axially on the main shaft. Thereby the washer disc has a clearance with the ring disc and the spring element when viewed radially on its side (towards the ring disc) and when viewed axially in the direction of the main shaft. This is done in such a way that the spring element, when viewed axially, is arranged between the upper part of the washer disc and the ring disc and presses against the main shaft gear.

The ring disc is arranged in the invention in such a way that the axial forces from the bevel gear teeth of the main shaft gears is transferred to the main shaft at for example inner diameter. In addition, the spring element designed preferably as a disc spring elongates up to the length of the play between the washer discs so that the spring element can be dimensioned minutely. As per the invention, the ring disc shows good sliding properties on the side attached to the main shaft gear.

With reference to an especially advantageous extension of the invention it is suggested that the washer disc is arranged on the ring disc is dimensioned at least in the radial direction such that the leverage of the pressing of the ring disc against the main shaft is increased.

The innovative concept offers a cost effective and easily achievable solution through which the axial movement of the main shaft gear is reduced considerably.

BRIEF DESCRIPTION OF THE DRAWINGS

The invention will now be described, by way of example, with reference to the accompanying drawings in which:

The sole FIGURE shows a schematic of the relevant sectional view of relevant regions of the main shaft of the transmission with two countershafts. This covers an especially advantageous design of the invented device as an example.

DETAILED DESCRIPTION OF THE INVENTION

Figure 1:
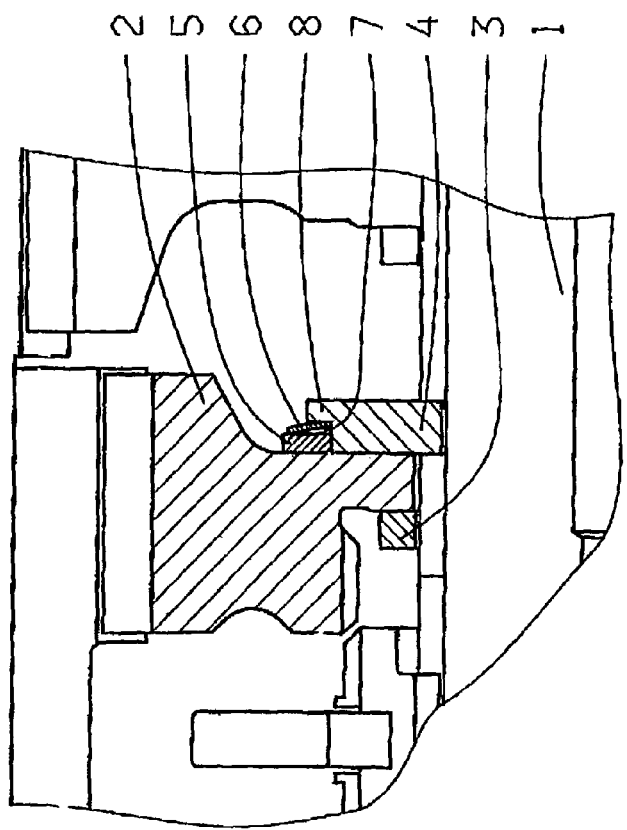

A main shaft 1 is shown in the FIGURE on which there is a main shaft gear 2 arranged between two washer discs 3 and 4 which hold the main shaft gear 2 axially. The washer discs 3 and 4 are fitted on to the main shaft 1 with respective slots so that they do not rotate.

To minimize the play of the main shaft gear 2 between the washer discs 3 and 4 is a device comprising of a ring disc 5 and a spring element constructed as a disc spring 6 which presses the main shaft gear 2 against the washer disc 3.

The ring disc 5 is arranged concentrically with the washer disc 4 which holds the main shaft gear 2 on to the main shaft 1 whereby washer disc 4 has a clearance 7 with the ring disc 5 and the spring element 6 when viewed radially on its side (towards the ring disc 5) and when viewed axially in the direction of the main shaft 2. In this way the spring element 6 when viewed axially is arranged between an upper part 8 of the washer disc 4 and the ring disc 5 and presses the ring disc 5 against the main shaft gear 2. As a result of this the main shaft gear 2 is pressed against the washer disc 3. The axial forces transferred to the main shaft gear 1 through the ring disc 5 and the washer disc 4. As explained earlier, the spring element 6 is stretched to the magnitude of the play between the washer discs 3 and 4. In addition, the ring disc 5 and the washer disc 3 have good sliding properties on the sides facing the main shaft gear 2.

As is clear from the FIGURE, the washer disc 4, which is arranged on the ring disc 5, when viewed radially is dimensioned larger than the other washer disc 3 so that the leverage of the pressure against the main shaft gear 2 is increased.

Understandably every constructive design, especially every spatial arrangement of the parts of the invented device, especially the spring elements and the ring disc, as far as it may be technically meaningful, comes under the protection of the disclosure, without influencing the function of the device even when the design is not shown explicitly in the FIGURE or explained as above.

REFERENCE NUMERALS 1 main shaft
2 main shaft gear
3 washer disc
4 washer disc
5 ring disc
6 spring element, disc spring
7 clearance
8 upper part of the washer disc 4

The invention claimed is:

1. A device for reduction of axial movement of a main shaft gear (2) in a transmission with at least two countershafts in which the main shaft gear (2) is axially restrained on a main shaft (10) between first and second washer discs (4, 3), the device comprising:
   a spring element (6) and a ring disc (5) arranged on the main shaft (1) between a first washer disc (4) of the first and the second washer disks (4, 3) and the main shaft gear (2),
   wherein an axial thickness of the first washer disc (4) is reduced in an outer circumferential region concentric with the main shaft (1) and on a side of the first washer disc (4) facing toward the main shaft gear (2),
   the spring element (6) and the ring disk (5) are concentric with the main shaft (1) and the spring element (6) and at least a portion of the ring disk (5) are located in the circumferential region of the reduced thickness of the first washer disc (4) with the spring element (6) arranged between the first washer disc (4) and the ring disc (5) so that
   the spring element (6) is axially restrained by the first washer disc (4), and
   the spring element (6) resiliently biases the ring disc (5) against the main shaft gear (2) and the main shaft gear (2) against the second washer disc (3) thereby resiliently restraining axial movement of the main shaft gear (2) along the main shaft (1).

2. The device for reduction of axial movement of in the transmission with the at least two countershafts according to claim 1 wherein the spring element (6) is a disc spring.

3. The device for reduction of axial movement of the main shaft gear (2) in the transmission with the at least two countershafts according to claim 1, wherein the ring disc (5) has properties which facilitate sliding of the ring disc (5) relative to the main shaft gear (2).

4. The device for reduction of axial movement of the main shaft gear (2) in the transmission with the at least two countershafts according to claim 1, wherein the spring element (6) is stretched to compensate for play between the first and the second washer discs (3, 4).

5. The device for reduction of axial movement of the main shaft gear (2) in the transmission with the at least two countershafts according to claim 1, wherein the first washer disc (4) on which the ring disc (5) is arranged, is larger in radial dimension than the second washer disc (3) so as to increase a biasing leverage of the main shaft gear (2).

6. A device for reduction of axial movement of a main shaft gear (2) in a transmission with at least two countershafts in which the main shaft gear (2) is axially restrained on a main shaft (10) between first and second washer discs (4, 3), the device comprising:
   a spring element (6) and a ring disc (5) arranged on the main shaft (1) between a first washer disc (4) of the first and the second washer disks (4, 3) and the main shaft gear (2),
   wherein an axial thickness of the first washer disc (4) is reduced in an outer circumferential region concentric with the main shaft (1) and on a side of the first washer disc (4) facing toward the main shaft gear (2),
   the spring element (6) and the ring disk (5) are both concentric with the main shaft (1) and the spring element (6) engages against at least an outer circumference of the first washer disc (4) with the spring element (6) arranged between the first washer disc (4) and the ring disc (5) so that
   the spring element (8) is axially restrained by the first washer disc (4), and
   the spring element (6) resiliently biases the ring disc (5) against the main shaft gear (2) and the main shaft gear (2) against the second washer disc (4) of the first and second washer discs (3), and the second washer disc (3) has smaller radius than the first washer disc (4).

* * * * *